(12) United States Patent
Ciurumelea et al.

(10) Patent No.: US 8,396,935 B1
(45) Date of Patent: Mar. 12, 2013

(54) DISCOVERING SPAM MERCHANTS USING PRODUCT FEED SIMILARITY

(75) Inventors: Mircea Gabriel Ciurumelea, Zurich (CH); Stefan Christoph, Zurich (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/443,675

(22) Filed: Apr. 10, 2012

(51) Int. Cl.
G06F 15/16 (2006.01)

(52) U.S. Cl. ............... 709/207; 705/14.49; 705/7.28; 726/23

(58) Field of Classification Search .................. None
See application file for complete search history.

(56) References Cited

U.S. PATENT DOCUMENTS

| | | | | |
|---|---|---|---|---|
| 6,199,102 | B1 * | 3/2001 | Cobb | 709/206 |
| 6,546,416 | B1 * | 4/2003 | Kirsch | 709/206 |
| 6,658,394 | B1 | 12/2003 | Khaishgi et al. | |
| 7,181,761 | B2 * | 2/2007 | Davis et al. | 726/1 |
| 7,249,175 | B1 * | 7/2007 | Donaldson | 709/225 |
| 7,272,853 | B2 * | 9/2007 | Goodman et al. | 726/13 |
| 7,403,922 | B1 | 7/2008 | Lewis et al. | |
| 7,464,264 | B2 * | 12/2008 | Goodman et al. | 713/154 |
| 7,552,186 | B2 * | 6/2009 | Werner et al. | 709/207 |
| 7,665,131 | B2 * | 2/2010 | Goodman et al. | 726/13 |
| 7,668,769 | B2 | 2/2010 | Baker et al. | |
| 8,046,832 | B2 * | 10/2011 | Goodman et al. | 726/23 |
| 8,065,370 | B2 * | 11/2011 | Hulten et al. | 709/206 |
| 2003/0009698 | A1 * | 1/2003 | Lindeman et al. | 713/201 |
| 2003/0187759 | A1 | 10/2003 | Arthus et al. | |
| 2005/0015455 | A1 * | 1/2005 | Liu | 709/207 |
| 2005/0149455 | A1 | 7/2005 | Bruesewitz et al. | |
| 2006/0253458 | A1 * | 11/2006 | Dixon et al. | 707/10 |
| 2007/0106582 | A1 | 5/2007 | Baker et al. | |
| 2007/0129999 | A1 | 6/2007 | Zhou et al. | |
| 2010/0161734 | A1 * | 6/2010 | Wang | 709/206 |

FOREIGN PATENT DOCUMENTS

| | | | |
|---|---|---|---|
| KR | 2007-0091527 | A | 9/2007 |
| KR | 2010-0011393 | A | 2/2010 |

OTHER PUBLICATIONS

Androutsopoulos, Learning to Filter Spam E-Mail: A Comparison of a Naive Bayesian and a Memory-Based Approach; 4th PKDD's Workshop on Machine Learning and Textual Information Access, 2000 13 pages.*
Argamon, et al., "Routing documents according to style"; In First International Workshop on Innovative Information Systems, 1998.*
Bowman, "Hotmail Spam Filters Block Outgoing E-mail"; CNET News.com, Jan. 18, 2001.*

(Continued)

*Primary Examiner* — Gurkanwaljit Singh
(74) *Attorney, Agent, or Firm* — Johnson, Marcou & Isaacs, LLC (57) ABSTRACT

Discovering spam merchants using product feed comparison comprises a merchant signature computed by a comparison system using the offer data submitted by a merchant. The merchant submits a file to the comparison system for use on a product comparison website. The comparison system processes the file and calculates a merchant signature by parsing a specific feature common to all offers. The comparison system assigns a data value to each of the specific features included in each of the offers and generates a string of assigned data values. The comparison system executes a hash algorithm for the string of data values to obtain the merchant signature. The merchant signature is compared with the signatures of known spam merchants and if the merchant signature is within a predefined threshold of known spam merchant signatures, the merchant is rejected and the signature is marked as a spam merchant.

28 Claims, 4 Drawing Sheets

OTHER PUBLICATIONS

Cunningham, et al., "A Case-Based Approach to Spam Filtering that Can Track Concept Drift" Trinity College, Dublin, Department of Computer Science, May 13, 2003.*

Fawcett, ""In vivo" Spam Filtering: A Challenge Problem for KDD"; SIGKDD Explorations, Dec. 2003. pp. 140-148, vol. 5 Issue 2, ACM.*

Gee, "Using Latent Semantic Indexing to Filter Spam" Dept. of Computer Science and Engineering, University of Texas-Arlington. 5 pages. Proceedings of the 2003 ACM symposium on Applied Computing. 2003 portal.acm.org.*

Graham, "The Future of Spam", Computer Security Journal, CSI Computer Security Institute, vol. XIX, No. 1, Jan. 2003, pp. 1-5.*

O'Brien, et al., "Spam Filters: Bayes vs. Chi-squared; Letters vs. Words" Proceedings of the 1st international symposium on Information and communication technologies, 2003, pp. 291-296, Dublin, Ireland.*

U.S. Appl. No. 12/720,082, filed Mar. 9, 2010.

U.S. Appl. No. 12/109,772, filed Apr. 25, 2008.

* cited by examiner

DISCOVERING SPAM MERCHANTS USING PRODUCT FEED SIMILARITY

TECHNICAL FIELD

The present disclosure relates generally to online shopping, and more particularly to methods and systems that enable the identification of malicious or fraudulent merchants using product feeds.

BACKGROUND

Electronic commerce, such as online shopping, has been increasingly common since the advent of the Internet. Merchants may develop and maintain an online shopping website that provides a user interface for customers to select products to purchase, and then have their orders processed directly by the merchant or a third party intermediary. However, the user must navigate to the merchant's online shopping website to search for and ultimately purchase the product.

Product comparison websites have been developed to direct users to the merchant's online shopping website. The product comparison websites provide the user with an interface comprising form fields into which the user can type a product query. The product comparison website executes the query and returns a list of merchants selling that particular product, as well as pricing information. The user can click on a product displayed in the list and is directed to the merchant's website.

Merchants elect to be included in by the product comparison website by submitting offer feeds for one or more products. However, spam merchants exist that upload malicious or fraudulent offer feeds with the intent of getting undeserved user traffic. A spam merchant may require that the user has to click through useless intermediate spam pages to get to the real product page. The user may purchase counterfeit merchandise or illegal drugs from unlicensed pharmacies. Alternatively, the spam merchant may send the wrong product, no product at all, or they may steal the user's credit card information.

Once a spam merchant is identified, it is removed from the product comparison website query. However, spam merchants tend to reopen a new account with the product comparison website after changing their website address, the appearance of their site, or making other minor changes to the offer feed submitted.

SUMMARY

In certain exemplary aspects, a method and system of discovering spam merchants comprises a merchant signature computed by a merchant comparison system using the offer feed file data submitted by a merchant. The merchant submits a file to the merchant comparison system for use on a product comparison website. The file comprises offer data for one or more products for sale by the merchant. The merchant comparison system processes the file and calculates a merchant signature by parsing a specific feature common to all offers, such as title, product description, price, or photo. The merchant comparison system assigns a data value to each of the specific features included in each of the offers and generates a string of assigned data values. The merchant comparison system then executes a hash algorithm for the string of data values assigned to the specific feature to obtain a merchant signature. The merchant signature is compared with the signatures of known spam merchants and if the signature is not within a predefined threshold of known spam merchant signatures, the merchant is accepted and the offer data becomes available for display in user queries. If the merchant signature is within a predefined threshold of known spam merchant signatures, the merchant is rejected and the signature is marked as a spam merchant. The merchant's offer data then does not become available for display in user queries.

These and other aspects, objects, features and advantages of the exemplary embodiments will become apparent to those having ordinary skill in the art upon consideration of the following detailed description of illustrated exemplary embodiments, which include the best mode of carrying out the invention as presently presented.

DETAILED DESCRIPTION OF EXEMPLARY EMBODIMENTS

Overview

The exemplary embodiments provide methods and systems that enable merchant comparison systems to discovering spam merchants using product feed comparison. A merchant signature computed by a merchant comparison system using the offer feed file data submitted by a merchant. The merchant submits a data file to the merchant comparison system for use on a product comparison website. The data file comprises offer data for one or more products for sale by the merchant. The merchant comparison system receives the file from the merchant and analyzes it to ensure all the necessary data fields are included. For example, the merchant comparison system ensures that a predefined specific feature common to all offers is submitted with the offer data, such as the product title. If the required fields are not included, the data file is rejected. If all the required fields are included in the file data, the merchant comparison system parses the data into component offers. For example, the file data may comprise multiple offers for different products. The merchant comparison system parses the data in single component offers for use in computing the merchant's signature and for use in displaying the merchant's offers in response to a user query. The component offers are saved in the data storage unit.

The merchant comparison system retrieves the component offers to calculate the merchant's signature. The merchant comparison system parses the component offers into features of the offer and retrieves a predefined specific feature common to all offers, such as title, product description, price, photo, or other suitable feature. The merchant comparison system assigns a data value to each of the specific features included in each of the offers and generates a string of assigned data values. In an exemplary embodiment, the data value is a numerical value. For example, the merchant comparison system uses a hash function to generate a numerical value. Once a string of assigned data values is generated, the merchant comparison system executes a hash algorithm for the string of data values assigned to the specific feature to obtain a merchant signature. In an alternative exemplary embodiment, the merchant comparison system assigns a data value to two or more specific features included in each of the offers. It generates separate strings of the assigned data values for each of the specific features. This allows the generation of more than one signature for the merchant.

The signatures of known spam merchants are marked. Known spam merchants can be discovered by any suitable means, such as complaint(s) received by a user, review by an analyst, or when a newly computed merchant system signature is within a designated threshold of a known spam merchant system signature. The merchant signature is compared with the signatures of known spam merchants. If the signature is not within a predefined threshold of known spam merchant signatures, the merchant is accepted and the offer data becomes available for display in user queries. If the merchant signature is within a predefined threshold of known spam merchant signatures, the merchant is rejected and the signature is marked as a spam merchant. The merchant's offer data then does not become available for display in user queries. The merchant is notified of the rejection and provided with an opportunity to object to the rejection. At that time an analyst will review the merchant data and determine whether the merchant is a spam merchant. If the analyst determines that the merchant is not a spam merchant, the merchant's signature will be removed from those of known spam merchants, the merchant's offer data becomes accepted by the merchant comparison systems and the merchant's offers data become available for display in user queries.

The functionality of the exemplary embodiments will be explained in more detail in the following description, read in conjunction with the figures illustrating the program flow.

System Architecture

Turning now to the drawings, in which like numerals indicate like (but not necessarily identical) elements throughout the figures and exemplary embodiments are described in detail.

Figure 1:
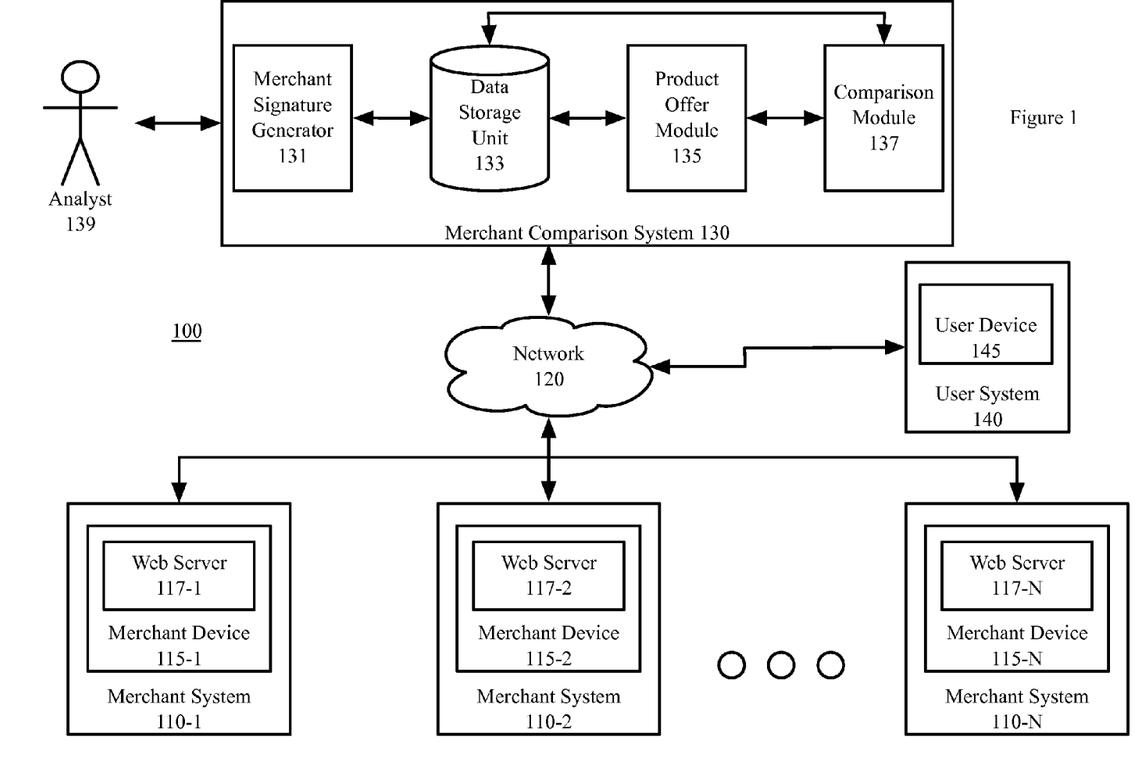
FIG. 1 is a block diagram depicting an operating environment for a system for detecting spam merchants using product feed similarity according to an exemplary embodiment.

FIG. 1 is a block diagram depicting an operating environment 100 for a system for detecting spam merchants using product feed similarity. As depicted in FIG. 1, the exemplary operating environment 100 includes one or more merchant systems 110, a merchant comparison system 130 and a user system 140 that are configured to communicate with one another via one or more networks 120.

The network 120 comprises a telecommunication means by which network devices (including devices 110, 130 and 140) can exchange data. For example, the network 120 can be implemented as, or may be a part of, a storage area network ("SAN"), personal area network ("PAN"), local area network ("LAN"), a metropolitan area network ("MAN"), a wide area network ("WAN"), a wireless local area network ("WLAN"), a virtual private network ("VPN"), an intranet, the Internet, Bluetooth, NFC or any other appropriate architecture or system that facilitates the communication of signals, data and/or messages (generally referred to as data). In an alternative exemplary embodiment, the network 120 can comprise a cellular network.

An exemplary merchant system 110 comprises a merchant device 115. The merchant device 115 may be a computer, mobile device (for example, notebook, computer, tablet computer, netbook computer, personal digital assistant ("PDA"), video game device, GPS locator device, cellular telephone, Smartphone or other mobile device), or other appropriate technology that includes or is coupled to a web server 117 (for example, Google Chrome, Microsoft Internet Explorer, Netscape, Safari, Firefox, or other suitable application for interacting with web page files).

The merchant may use the merchant device 115 to create and submit an offer feed to the merchant comparison system 130 for inclusion in product queries requested by a user. In an exemplary embodiment, multiple merchant systems 110-1, 110-2, . . . 110-N create and submit offer feeds to the merchant comparison system 130. An exemplary offer feed comprises the title of the product (for example, "camera") and an offer price. In an alternative exemplary embodiment, the offer feed comprises additional fields such as product description, product photo, merchant name, quantity remaining, sale price, original price, online availability, universal product code, color, size, and other relevant sale information. The offer feed submitted to the merchant comparison system 130 also comprises information identifying the merchant that allows the user to be directed to the merchant's website.

An exemplary merchant comparison system 130 comprises a merchant signature generator 131, a data storage unit 133, a product offer module 135 and a comparison module 137. The offer feeds submitted by the merchant system 110 are received by the product offer module 135. The product offer module 135 stores the offer feeds in the data storage unit 133 for use by the merchant signature generator 131 and the comparison engine 137.

An exemplary user system 140 comprises a user device 145. The user device 145 may be a personal computer, mobile device (for example, notebook, computer, tablet computer, netbook computer, personal digital assistant ("PDA"), video game device, GPS locator device, cellular telephone, Smartphone or other mobile device), or other appropriate technology that includes or is coupled to a web server (for example, Google Chrome, Microsoft Internet Explorer, Netscape, Safari, Firefox, or other suitable application for interacting with web page files).

The user can access the merchant comparison system 130 using the user device 145 to issue a product query. The user navigates to the merchant comparison system 130 website and enters the search terms using the user interface (not illustrated) on the user device 145. The comparison engine 137 of the merchant comparison system 130 retrieves submitted offers submitted by the merchant system 110 in response to the user's query and outputs the resulting lists of products that corresponds to the user's query. The user may select a product from the resulting list and may be directed to the website of the merchant whom submitted the offer feed.

The merchant comparison system 130 can identify and remove spam merchants from inclusion in by the comparison engine 137 by computing a signature for each merchant system 110 based on the offer feed submitted. The merchant signature generator 131 retrieves the offer feeds from the data storage unit 133 and determines whether the merchant is a spam merchant using the computed signatures of known spam merchants. Merchants may object to being classified as a spam merchant by the merchant signature generator 131 and request review by an analyst 139. The method of determining a spam merchant is described in more detail hereinafter with reference to the methods described in FIGS. 2-4.

System Process

Figure 2:
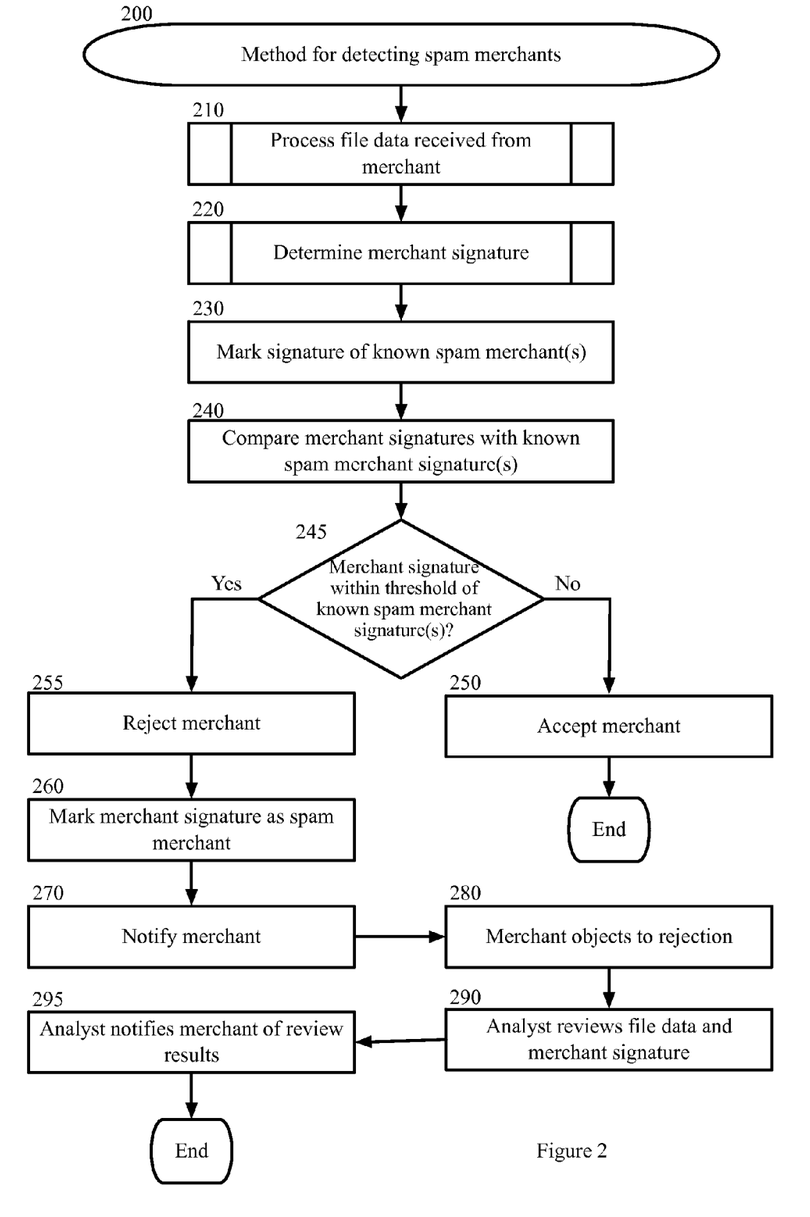
FIG. 2 is a block flow diagram depicting a method for detecting a spam merchant system according to an exemplary embodiment.

FIG. 2 is a block flow diagram depicting a method for detecting a spam merchant system 110 according to an exemplary embodiment. The method 200 is described with reference to the components illustrated in FIG. 1.

In block 210, the merchant comparison system 130 processes the offer feed received from the merchant system 110. The method of processing offer feed data received from the merchant system 110-1 is described in more detail hereinafter with reference to the methods described in FIG. 3.

Figure 3:
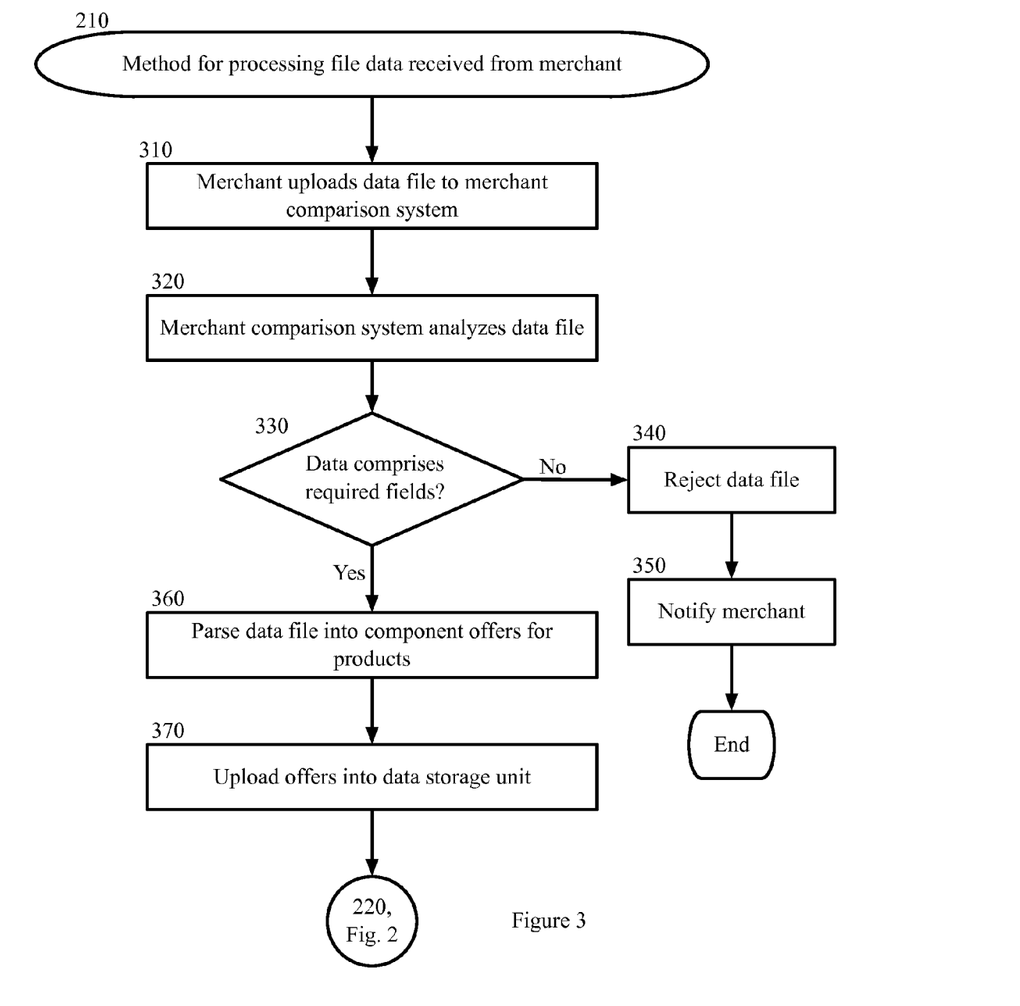
FIG. 3 is a block flow diagram depicting a method for processing offer feed file data received from a merchant system according to an exemplary embodiment.

FIG. 3 is a block flow diagram depicting a method for processing offer feed file data received from the merchant system 110-1 according to an exemplary embodiment, as referenced in block 210 of FIG. 2. The method 210 is described with reference to the components illustrated in FIG. 1.

In block 310, the merchant system 110-1 uploads or submits offer feed file data to the merchant comparison system 130. In an exemplary embodiment, the offer feed file data comprises XML file data. In an exemplary embodiment, the product offer module 135 receives the offer feed file data from the merchant system 110-1 and saves the data in the data storage unit 133 for use by the merchant signature generator 131 and the comparison module 137. In an exemplary embodiment, the merchant system 110-1 uploads or submits offer feed file data to the merchant comparison system 130 as a bulk file upload, wherein multiple offers are submitted in a single submission. In an alternative exemplary embodiment, the merchant system 110-1 uploads or submits offer feed file data to the merchant comparison system 130 one offer at a time. In this embodiment, the merchant system's 110-1 offers may be compiled before processing and calculation of the merchant signature. In an alternative exemplary embodiment, the merchant system's 110-1 offers may be processed as they are submitted and later combined with any previously-submitted offers for the calculation of the merchant signature.

In block 320, the merchant comparison system 130 analyzes the offer feed file data. In an exemplary embodiment, the data is retrieved from the data storage unit 133 and analyzed by the merchant signature generator 131. In an alternative exemplary embodiment, the data is analyzed by the product offer module 135 prior to being saved in the data storage unit 133.

In block 330, the merchant comparison system 130 determines whether the offer feed file data comprises the required fields of data. In an exemplary embodiment, the merchant comparison system 130 defines the required fields of data prior to submission by the merchant system 110-1. In an exemplary embodiment, the required fields of data comprises a feature defined by the merchant comparison system 130 to be used in calculating the merchant's signature. For example, the product title, product description, product photo or product price. In an exemplary embodiment, the product title and product price are required fields of data.

If the offer feed file data does not comprise the required data fields, the merchant comparison system 130 rejects the data file in block 340. In an exemplary embodiment, the offer feed data is removed from the data storage unit 133 and removed from the merchant comparison system 130.

In block 350, the merchant comparison system 130 notifies the merchant system 110-1. In an exemplary embodiment, the merchant comparison system 130 notifies the merchant system 110-1 of the deficiency. In an alternative exemplary embodiment, the merchant comparison system 130 notifies the merchant system 110-1 that the file has been rejected.

Returning to block 330 of FIG. 3, if the merchant comparison system 130 determines that the offer feed file data comprises the required fields, the method proceeds to block 360 (FIG. 3).

In block 360, the merchant comparison system 130 parses the offer feed file data into component offers for products. In an exemplary embodiment, the product offer module 135 parses the data prior to saving the data in the data storage unit 133. In an alternative exemplary embodiment, the merchant signature generator 131 parses the data. In an exemplary embodiment, the component offers each comprises the required data fields, as determined in block 330 of FIG. 3. For example, if the merchant system 110-1 submits an offer feed for a camera and a paperclip, the merchant comparison system 130 will separate the offer feed into the component offers:

| Component Offer | Title | Price |
|---|---|---|
| Offer #1: | Camera | $99 |
| Offer #2: | Paperclip | $1 |

In an exemplary embodiment, the component offers are retrieved by the comparison module 137 in response to a user query. Component offers from multiple merchant systems 110 are returned to the user in response to the query in the form of search results or a list of products. In an exemplary embodiment, the returned results displays component offers that correspond to the user's query. The additional component offers contained in a merchant system's 110-1 offer feed file data are not displayed.

In block 370, the component offers are saved in the data storage unit 133. In an exemplary embodiment, the offers are saved by the product offer module 135.

The method 210 (FIG. 3) then proceeds to block 220 of FIG. 2.

Returning to FIG. 2, in block 220, the merchant comparison system 130 determines the merchant system 110-1 signature. The method of determining the merchant system 110-1 signature is described in more detail hereinafter with reference to the methods described in FIG. 4.

Figure 4:
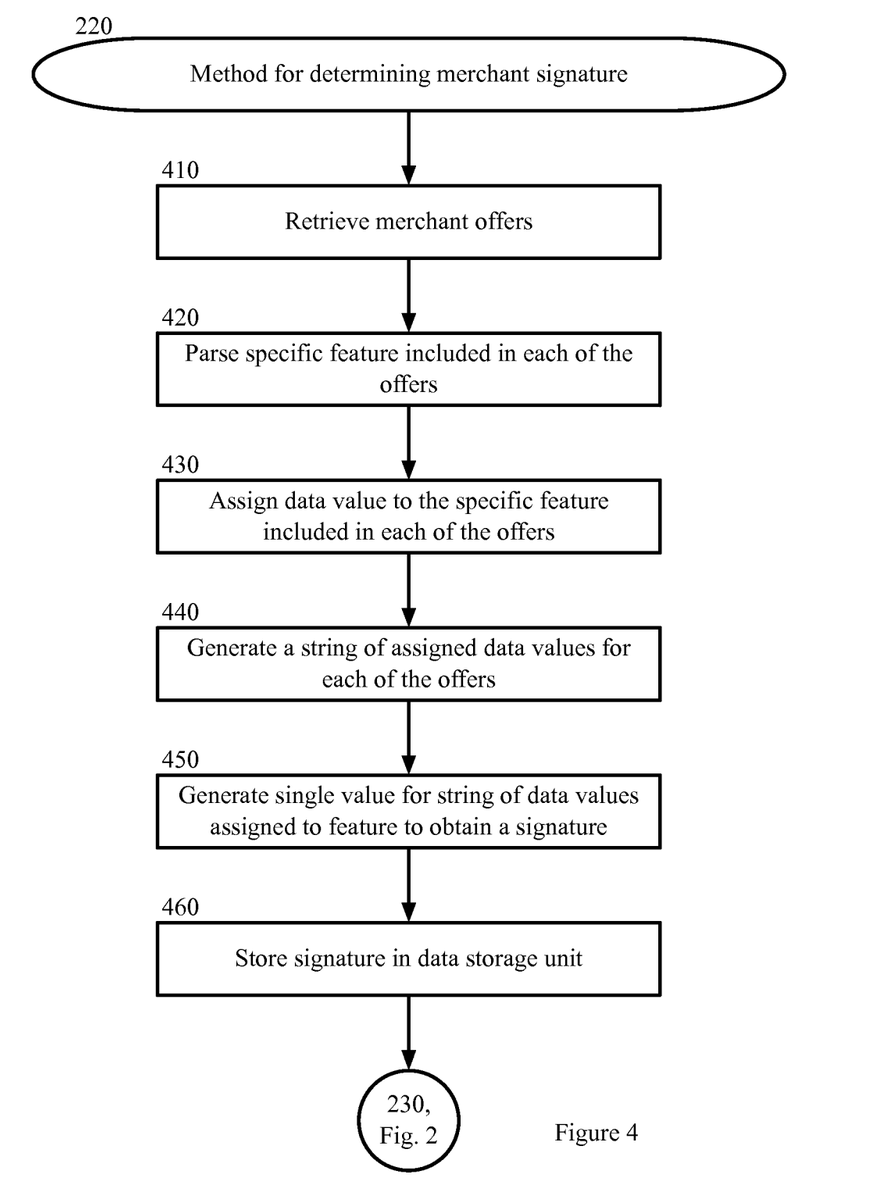
FIG. 4 is a block flow diagram depicting a method for determining a merchant signature according to an exemplary embodiment.

FIG. 3 is a block flow diagram depicting a method determining the merchant system 110-1 signature according to an exemplary embodiment, as referenced in block 220 of FIG. 2. The method 220 is described with reference to the components illustrated in FIG. 1.

In block 410, the merchant comparison system 130 retrieves the component offers from the data storage unit 133. In an exemplary embodiment, the merchant signature generator 131 retrieves the component offers and performs the methods described hereinafter in blocks 410 through 460.

In block 420, the merchant comparison system 130 parses the specific features included in each of the component offers. The merchant comparison system 130 parses each of the component offers retrieved from the offer feed file data in block 360 of FIG. 3. In an exemplary embodiment, the specific features comprise a feature designated by the merchant comparison system 130 as being used to compute the merchant system 110 signature.

In an exemplary embodiment, the feature designated by the merchant comparison system 130 is being used to compute the merchant system 110-1 signature is the title of the product. The merchant comparison system 130 reviews the title field of each component offer submitted by the merchant and pulls out the relevant portion (i.e. the title). For example, the merchant system 110-1 may insert extra letters or symbols into the title of the product. The merchant comparison system 130 may execute an n-gram model to be more robust against possible variation of a title of the product. The merchant comparison system 130 will pull out the title for each of the component offers submitted by the merchant system 110-1 in the offer feed file data. Continuing with the above example, if the merchant system 110-1 submits an offer feed for a camera and a paperclip, the merchant comparison system will pull out the title "camera" and the title "paperclip."

| Component Offer | Title |
|---|---|
| Offer #1: | Camera |
| Offer #2: | Paperclip |

In block 430, the merchant comparison system 130 assigns a data value to the specific feature included in each of the component offers. In an exemplary embodiment, the data value is a binary number. In an exemplary embodiment, the specific feature is the title of the product and the merchant comparison system uses a hash function to generate a data value. A hash function comprises any algorithm or subroutine that maps data sets of variable length to smaller data sets of a fixed length. Continuing with the above example, the merchant comparison system 130 will assign a fixed and hash value to each title:

| Component Offer | Title | Hash Value |
|---|---|---|
| Offer #1: | Camera | 1100 |
| Offer #2: | Paperclip | 001 |

In block 440, the merchant comparison system 130 generates a string of assigned data values for each of the offers. In an exemplary embodiment, the hash values assigned for each title are arranged in a string of values separated by the "or" function. In an exemplary embodiment, the hash values can be placed in any order, so long as they are separated by the "or" function. Continuing with the above example, the merchant comparison system 130 will generate a string of the hash values:

| Component Offer | Title | Hash Value |
|---|---|---|
| Offer #1: | Camera | 1100 |
| Offer #2: | Paperclip | 001 |
| String: | | 1100 [or] 001 |

In block 450, the merchant comparison system 130 will computer a single numeric value for the string of hash values to obtain a signature. In an exemplary embodiment, the merchant comparison system 130 will "or" the hash values together. Continuing with the above example, computes a unique value for the merchant system 110-1 based on all the offer titles submitted by the merchant:

| Merchant System 110-1 Signature: 1101 | | |
|---|---|---|
| Component Offer | Title | Hash Value |
| Offer #1: | Camera | 1100 |
| Offer #2: | Paperclip | 001 |
| String: | | 1100 [or] 001 |

In block 460, the merchant comparison system 130 stores the merchant system 110-1 signature in the data storage unit 135.

In an exemplary embodiment, the methods 210 and 220 can be repeated as necessary for each of the merchant systems 110-1, 110-2, . . . 110-N that submit an offer feed. In an exemplary embodiment, the methods 210 and 220 are performed each time a new offer feed is received.

The method 220 (FIG. 4) then proceeds to block 230 in FIG. 2.

Returning to FIG. 2, in block 230, the merchant comparison system 130 marks the signatures of known spam merchants systems 110-2. In an exemplary embodiment, the component offers of known spam merchant systems 110-2 are not available for use by the comparison module 137 to be outputted to users in response to a query. However, the signatures of known spam merchant systems 110-2 are saved in the data storage unit 113 for comparison to the merchant system 110-1 signature.

In an exemplary embodiment, a spam merchant system 110-2 can be discovered by any suitable means, such as complaint(s) received by a user, review by an analyst 139, or when a newly computed merchant system 110-1 signature is within a designated threshold of a known spam merchant system 110-2 signature.

In block 240, the merchant comparison system 130 compares the newly computed merchant system 110-1 signature with known spam merchant system 110-2 signatures. In an exemplary embodiment, the signatures of known spam merchant systems 110-2 are clustered with the newly computed merchant system 110-1 signature. In an exemplary embodiment, the merchant signature generator 131 performs the methods described in blocks 230-260. Continuing with the above example, the signature of a known spam merchant systems 110-2 is clustered with the newly computed merchant system 110-1:

| | |
|---|---|
| Merchant System 110-1 Signature: | 1101 |
| Known Spam Merchant System 110-2 Signature: | 1100 |

In block 245, the merchant comparison system 130 determines whether the newly computed merchant system 110-1 signature is within a predetermined threshold of the known spam merchant system 110-2 signature(s). For example, the merchant with the newly computed merchant system 110-1 signature may be deemed to be a spam merchant if it is a 95% or greater match to a known spam merchant system 110-2 signature. In an exemplary embodiment, the threshold value is configurable and may be chosen to be a sensitive as desired. For example, the lower the threshold value, the more spam merchant systems 110-2 that will be identified. And conversely, the higher the threshold value, the less spam merchant systems 110-2 that will be identified.

If the merchant comparison system 130 determines that the newly computed merchant system 110-1 signature is not within the threshold of known spam merchant system 110-2 signatures (i.e., the distance between the signature values is too great so the merchant systems 110-1 and 110-2 did not submit similar offer feeds) the merchant system 110-1 is accepted. In an exemplary embodiment, the merchant system 110-1 offers become available for use by the comparison module 137 to be outputted to users in response to a query and the merchant's signature is saved in the data storage unit 133.

Returning to block 245 (FIG. 2), if the merchant comparison system 130 determines that the newly computed merchant system 110-1 signature is within the threshold of known spam merchant system 110-2 signatures (i.e., the distance between the signature values is small so the merchant systems 110-1 and 110-2 submitted similar offer feeds) the merchant system 110-1 is rejected. In an exemplary embodiment, the merchant system 110-1 offers are removed from the data storage unit 133 and are not available for use by the comparison module 137.

In block 260, the merchant comparison system 130 marks the newly computed merchant system 110-1 signature as a known spam merchant. In an exemplary embodiment, the merchant system 110-1 signature is saved in the data storage unit 133 with the other known spam merchant system 110-2 signatures.

In block 270, the merchant comparison system 130 notifies the merchant system 110-1 of the rejection and removal of the offer feed file data.

In block 280, the merchant system 110-1 may object to the rejection. In an exemplary embodiment, the merchant system 110-1 is provided with a mechanism by which it can protest the designation as a spam merchant system.

In block 290, an analyst 139 is assigned to review the merchant system 110-1 offer feed file data submitted and determine whether the merchant system 110-1 is a spam merchant system. In an exemplary embodiment, the analyst 139 reviews the offer data and the calculation of the merchant system 110-1 signature. In an alternative exemplary embodiment, the analyst 139 also reviews the data submitted by the known spam merchant system 110-2.

In block 295, the merchant comparison system 130 notifies the merchant system 110-1 of the results of the analyst's 139 review. In an exemplary embodiment, the merchant system 110-1 is accepted as a legitimate merchant system as described in reference to block 250 (FIG. 2) and the merchant system 110-1 is removed from the list of known spam merchant system 110-2 signatures. In an alternative exemplary embodiment, the merchant system 110-1 remains rejected as a spam merchant system and the merchant system 110-1 signature remains on the list of known spam merchant system 110-2 signatures.

General

One or more aspects of the exemplary embodiments may include a computer program that embodies the functions described and illustrated herein, wherein the computer program is implemented in a computer system that comprises instructions stored in a machine-readable medium and a processor that executes the instructions. However, it should be apparent that there could be many different ways of implementing the exemplary embodiments in computer programming, and the exemplary embodiments should not be construed as limited to any one set of computer program instructions. Further, a skilled programmer would be able to write such a computer program to implement an embodiment based on the appended flow charts and associated description in the application text. Therefore, disclosure of a particular set of program code instructions is not considered necessary for an adequate understanding of how to make and use the exemplary embodiments. Moreover, any reference to an act being performed by a computer should not be construed as being performed by a single computer as more than one computer may perform the act.

The exemplary systems, methods, and blocks described in the embodiments presented previously are illustrative, and, in alternative embodiments, certain blocks can be performed in a different order, in parallel with one another, omitted entirely, and/or combined between different exemplary methods, and/or certain additional blocks can be performed, without departing from the scope and spirit of the invention. Accordingly, such alternative embodiments are included in the invention described herein.

The invention can be used with computer hardware and software that performs the methods and processing functions described above. As will be appreciated by those having ordinary skill in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

Although specific embodiments of the invention have been described above in detail, the description is merely for purposes of illustration. Various modifications of, and equivalent blocks and components corresponding to, the disclosed aspects of the exemplary embodiments, in addition to those described above, can be made by those having ordinary skill in the art without departing from the spirit and scope of the invention defined in the following claims, the scope of which is to be accorded the broadest interpretation so as to encompass such modifications and equivalent structures.

What is claimed is:

1. A computer-implemented method for detecting spam merchants, comprising:

processing, by a computer operated by a merchant comparison system, an offer feed received from a merchant, wherein the offer feed comprises file data for a plurality of product offers, each of the product offers comprising file data for a product for sale by the merchant;

parsing, by the computer operated by the merchant comparison system, an element from each of the product offers;

assigning, by the computer operated by the merchant comparison system, for each of the product offers, a data value to the parsed element for the corresponding product offer, thereby creating a plurality of data values;

generating, by the computer operated by the merchant comparison system, a string of the data values for the merchant based on the data values assigned to the corresponding elements for each of the product offers parsed from the offer feed data received from the merchant;

calculating, by the computer operated by the merchant comparison system, a merchant signature for the merchant, the merchant signature being a numeric value computed from the string of data values;

marking, by the computer operated by the merchant comparison system, signatures of known spam merchants, wherein the spam merchants are known to have previously submitted malicious or fraudulent file data;

comparing, by the computer operated by the merchant comparison system, the calculated merchant signature to signatures of known spam merchants;

determining, by the computer operated by the merchant comparison system, that the calculated merchant signature is within a specified threshold of one of the signatures of the known spam merchants based on the comparison of the calculated merchant signature to the signatures of known spam merchants; and identifying, by the computer operated by the merchant comparison system, the merchant associated with the calculated merchant signature as being a spam merchant in response to determining that the calculated merchant signature is within the threshold of one of the signatures of known spam merchants.

2. The computer-implemented method of claim 1, wherein the computer manages a product comparison website.

3. The computer-implemented method of claim 1, wherein each of the data values comprises a binary number, and wherein the string of the data values comprises the binary numbers separated by an OR function.

4. The computer-implemented method of claim 1, wherein processing the file data from the merchant comprises:
   receiving, by the computer, the offer feed from the merchant; and
   parsing, by the computer, the offer feed into the plurality of offers for products, each of the plurality of offers comprising a title and a price for a product.

5. The computer-implemented method of claim 1, wherein a n-gram model is used when parsing the element from each of the plurality of offers.

6. The computer-implemented method of claim 1, wherein the signature is calculated using a hash algorithm.

7. The computer-implemented method of claim 1, wherein the element of each of the plurality of offers used to calculate the merchant signature comprises a product title.

8. The computer-implemented method of claim 1, wherein the element of each of the plurality of offers used to calculate the merchant signature comprises a product description.

9. The computer-implemented method of claim 1, wherein comparing the merchant signature to the signatures of known spam merchants further comprises clustering the signatures of known spam merchants.

10. The computer-implemented method of claim 1, wherein the spam merchant is one of a fraudulent merchant and a malicious merchant.

11. A computer program product, comprising:
   a non-transitory computer-readable medium having computer-readable program code embodied therein that when executed by a computer perform a method for detecting spam merchants, the computer-readable program code comprising:
      computer-readable program code for processing an offer feed received from a merchant, the offer feed comprising file data for a plurality of products for sale by the merchant;
      computer-readable program code for calculating a merchant signature for the merchant, the merchant signature being a numeric value computed from an element of each of the plurality of product offers in the offer feed received from the merchant;
      computer-readable program code for marking signatures of known spam merchants, wherein the spam merchants are known to have previously submitted malicious or fraudulent file data;
      computer-readable program code for comparing the merchant signature to the signatures of known spam merchants;
      computer-readable program code for determining that the merchant signature is within a specified threshold of one of the signatures of the known spam merchants based on the comparison of the merchant signature to the signatures of known spam merchants; and
      computer-readable program code for identifying, by the computer, the merchant associated with the merchant signature as being a spam merchant in response to determining that the merchant signature is within the specified threshold of one of the signatures of the known spam merchants.

12. The computer program product of claim 11, wherein the element of each of the component offers used to calculate the merchant signature comprises a product title.

13. The computer program product of claim 11, wherein the element of each of the component offers used to calculate the merchant signature comprises a product description.

14. The computer program product of claim 11, the computer-readable program code for processing the file data from the merchant comprising:
   computer-readable program code for receiving the offer feed for the merchant; and
   computer-readable program code for parsing the offer feed into a plurality of offers for products, each of the plurality of offers comprising a title and a price for a product.

15. The computer program product of claim 11, the computer-readable program code for calculating the merchant signature comprising:
   computer-readable program code for parsing the element from each of the plurality of offers, wherein the element is a required element of the offer;
   computer-readable program code for assigning a data value to the element for each of the plurality of offers thereby generating a plurality of data values, wherein each data value comprises a binary number; and
   computer-readable program code for generating a string of the data values for each of the plurality of offers, wherein the string of the data values comprises the binary numbers and an OR function.

16. The computer program product of claim 15, wherein a n-gram model is used when parsing the element from each of the component offers.

17. The computer program product of claim 11, the computer-readable program code for comparing the merchant signature to the signatures of known spam merchants comprising computer-readable program code for clustering the signatures of known spam merchants.

18. A system for detecting spam merchants, the system comprising:
   one or more information processing units for executing programs; and
   an engine executable on the one or more information processing units, the engine comprising:
      instructions for calculating a merchant signature, wherein the merchant signature is a numeric value computed from an element of each of a plurality of offers submitted for a merchant;
      instructions for marking signatures of known spam merchants, wherein the spam merchants are known to have provided malicious or fraudulent file data;
      instructions for determining whether the merchant signature is within a threshold of at least one of the signatures of the known spam merchants; and
      instructions for identifying the merchant associated with the merchant signature as being a spam merchant in response to determining that the merchant signature is within the threshold of at least one of the signatures of the known spam merchants.

19. The system of claim 18, wherein the engine further comprises instructions for processing file data received for the merchant, the file data comprising the plurality of offers.

20. The system of claim 19, wherein an element of each of the plurality of offers used to calculate the merchant signature comprises a product title.

21. The system of claim 19, wherein an element of each of the plurality of offers used to calculate the merchant signature comprises a product description.

22. The system of claim 18, the engine further comprising:
   instructions for receiving file data for the merchant, the file data comprising a plurality of offers; and
   instruction for parsing the file data into the plurality of offers for products, wherein the plurality of offers for products comprise a title and a price for each product.

23. The system of claim 18, the engine further comprising:
instructions for parsing an element from each of the plurality of offers, wherein the element is a required element of the corresponding offer;
instructions for assigning a data value to the element from each of the plurality of offers, wherein the data value comprises a binary number; and
instructions for generating a string of the data values for each of the plurality of offers, wherein the string of data values comprises the binary numbers and an OR function.

24. The system of claim 18, wherein the engine further comprises instructions for comparing the merchant signature to signatures of known spam merchants.

25. The system of claim 18, wherein a n-gram model is used to parse the element from each of the plurality of offers.

26. The system of claim 18, wherein the engine further comprises instructions for clustering the signatures of known spam merchants.

27. The computer program product of claim 11, wherein the signature is calculated using a hash algorithm.

28. The system of claim 18, wherein the signature is calculated using a hash algorithm.

* * * * *